United States Patent
Dai et al.

(10) Patent No.: US 12,018,809 B2
(45) Date of Patent: Jun. 25, 2024

(54) OPTICAL ELEMENT AND CORRESPONDING VEHICLE LAMP AND VEHICLE

(71) Applicant: VALEO VISION, Bobigny (FR)

(72) Inventors: Liang Dai, Wuhan (CN); Sihua Wu, Wuhan (CN); Liubo Wang, Wuhan (CN)

(73) Assignee: Valeo Vision, Bobigny (FR)

(*) Notice: Subject to any disclaimer, the term of this patent is extended or adjusted under 35 U.S.C. 154(b) by 170 days.

(21) Appl. No.: 17/467,504

(22) PCT Filed: Mar. 20, 2020

(86) PCT No.: PCT/CN2020/080302
§ 371 (c)(1),
(2) Date: Sep. 7, 2021

(87) PCT Pub. No.: WO2020/187307
PCT Pub. Date: Sep. 24, 2020

(65) Prior Publication Data
US 2023/0167959 A1    Jun. 1, 2023

(30) Foreign Application Priority Data
Mar. 20, 2019 (CN) .......................... 201920353679.0

(51) Int. Cl.
*F21S 41/26* (2018.01)
*B60Q 3/62* (2017.01)
*F21S 41/24* (2018.01)

(52) U.S. Cl.
CPC ................ *F21S 41/26* (2018.01); *B60Q 3/62* (2017.02); *F21S 41/24* (2018.01)

(58) Field of Classification Search
CPC .. F21S 41/23; F21S 41/25; F21S 41/24; F21S 41/26; B60Q 3/62; B60Q 1/0011
(Continued)

(56) References Cited

U.S. PATENT DOCUMENTS 9,234,641 B2  1/2016  Wu et al.
10,302,270 B2  5/2019  Hiki
(Continued)

FOREIGN PATENT DOCUMENTS

CN    104121545 A    10/2014
CN    105135316 A    12/2015
(Continued)

OTHER PUBLICATIONS

National Intellectual Property Administration, PRC, International Search Report and Written Opinion of International Application No. PCT/CN2020/080302, dated May 28, 2020, Beijing, China.
(Continued)

*Primary Examiner* — Laura K Tso
(74) *Attorney, Agent, or Firm* — Valeo Vision

(57) ABSTRACT

The present utility model provides an optical element, comprising: a light entry surface; a first reflective surface and a second reflective surface; a light exit surface; and at least one connecting surface, located between the first reflective surface and/or the second reflective surface on the one hand and the light exit surface on the other, wherein the connecting surface at least partly comprises an enhanced reflection part for expanding a maximum exit angle of emergent light exiting via the light exit surface. Advantages: there is no need to process a surface at the light exit surface, so the range of applicability of the optical element is increased; moreover, the optical element according to the present utility model has a greater distance between the light exit surface and light entry surface thereof, i.e. can be thicker, so the optical element can adapt to a greater variety of shapes.

12 Claims, 11 Drawing Sheets

(58) Field of Classification Search
USPC .................................................. 362/511, 617
See application file for complete search history.

(56) References Cited

U.S. PATENT DOCUMENTS

| | | | | |
|---|---|---|---|---|
| 2016/0186950 A1* | 6/2016 | Grosdidier | ............ | F21S 43/243 |
| | | | | 362/511 |
| 2018/0087734 A1* | 3/2018 | Miller | .................. | G02B 6/0091 |
| 2018/0149326 A1 | 5/2018 | Paroni et al. | | |
| 2018/0224083 A1* | 8/2018 | Nakayama | ............... | B60Q 1/44 |
| 2019/0032884 A1 | 1/2019 | Martus et al. | | |

FOREIGN PATENT DOCUMENTS

| | | | |
|---|---|---|---|
| CN | 105937749 | A | 9/2016 |
| CN | 107435880 | A | 12/2017 |
| CN | 108873143 | A | 11/2018 |
| CN | 209926259 | U | 1/2020 |
| JP | 2017174731 | A | 9/2017 |
| JP | 2017228490 | A | 12/2017 |
| WO | 2017P022507 | A1 | 2/2017 |

OTHER PUBLICATIONS

European Patent Office, Extended European Search Report of corresponding European Application No. 20772806.4, dated Oct. 20, 2022.

* cited by examiner

OPTICAL ELEMENT AND CORRESPONDING VEHICLE LAMP AND VEHICLE

CROSS-REFERENCE TO RELATED APPLICATIONS

This is a 371 application (submitted under 35 U.S.C. § 371) of International Application No. PCT/CN2020/080302 (WO2020/187307) filed on Mar. 20, 2020, which claims the priority date benefit of Chinese Application No. 201920353679.0 filed on Mar. 20, 2019, the disclosures of which are hereby incorporated by reference in their entirety.

TECHNICAL FIELD

The present utility model relates to the technical field of lighting, in particular to an optical element and a corresponding vehicle lamp and vehicle.

BACKGROUND

In order that certain conventional vehicle lamps, such as front lamps, can have a lighting range required by regulations, it is often necessary to add a prism structure, etc., to a surface of a vehicle lamp lens, to achieve a larger light exit angle. However, this kind of processing will often affect the appearance and shape of the vehicle lamp itself.

SUMMARY

In view of this, one problem solved by an embodiment of the present utility model is how to guarantee a light exit angle when a prism structure is removed.

According to one aspect of the present utility model, an optical element is provided, wherein the optical element comprises:
 a light entry surface;
 a first reflective surface and a second reflective surface; a light exit surface; and
 at least one connecting surface, located between the first reflective surface and/or the second reflective surface on the one hand and the light exit surface on the other, wherein the connecting surface at least partly comprises an enhanced light exiting via the light exit surface.

According to the solution of this embodiment, the angle of emergent light is realized through the use of the enhanced reflection part, hence the light exit angle can meet requirements without any need to provide a prism structure at the light exit surface.

In the optical element according to the present utility model, the optical element comprises two connecting surfaces, wherein one of the connecting surfaces is located between the first reflective surface and the light exit surface; and one of the connecting surfaces is located between the second reflective surface and the light exit surface.

According to the solution of this embodiment, the use of two connecting surfaces enables light exit angles at two sides of the light exit surface 120 to both meet requirements.

In the optical element according to the present utility model, the enhanced reflection part can make the maximum exit angle greater than an angle threshold a.

By setting the angle threshold, it is possible to effectively realize an enhanced reflection part that meets requirements.

In the optical element according to the present utility model, the enhanced reflection part comprises at least any one of the following optical structures:
 one or more straight-surface structures;
 one or more curved-surface structures;
 wherein at least one straight-surface structure or at least one curved-surface structure contained in the enhanced reflection part can make the maximum exit angle greater than the angle threshold.

The enhanced reflection part of the optical element according to the present utility model may be any combination of optical structures meeting exit angle requirements, irrespective of the form of combination. For example, multiple optical elements may be arranged adjacently, or arranged to be separated by a certain region, etc. By employing a combination of one or more optical structures, it is possible to realize a greater variety of light exit angles, meeting the demand for diversification.

In the optical element according to the present utility model, the connecting surface comprises the enhanced reflection part and a decorating part.

According to the solution of this embodiment, the enhanced reflection part may be arranged on the connecting surface in a continuous or non-continuous manner. It may also be arranged so as to alternate with the decorating part, etc.

In the optical element according to the present utility model, the angle threshold is 80 degrees.

By employing the angle threshold, it is possible to ensure that a light type obtained meets specified requirements.

According to another aspect of the present utility model, a vehicle lamp is also provided, the vehicle lamp comprising the optical element and a light source part, the light source part being immediately adjacent to the light entry surface of the optical element.

In the vehicle lamp according to the present utility model, light of the light source part enters the optical element through the light entry surface, and exits through the light exit surface.

In the vehicle lamp according to the present utility model, the light source part employs a strip light guide.

In the vehicle lamp according to this embodiment, a strip light guide parallel to a length direction of the light entry surface is employed, in order to obtain incident light of uniform intensity at the light entry surface.

In the vehicle lamp according to the present utility model, the vehicle lamp further comprises a support part for supporting the optical element and the light source part.

By employing the support part, it is possible to provide support and accommodation for the optical element and the light source part, to achieve more stable assembly. Mounting to another component such as a vehicle body is also facilitated.

According to a solution of the present utility model, there is no need to process a surface at the light exit surface, so the range of applicability of the optical element is increased; moreover, the optical element according to the present utility model has a greater distance between the light exit surface and light entry surface thereof, i.e. can be thicker, so the optical element can adapt to a greater variety of shapes.

BRIEF DESCRIPTION OF THE DRAWINGS

Other features, objects and advantages of the present utility model will become more obvious through perusal of a detailed description of non-limiting embodiments which makes reference to the accompanying drawings below.

LIST OF COMPONENT LABELS

Figure 1:
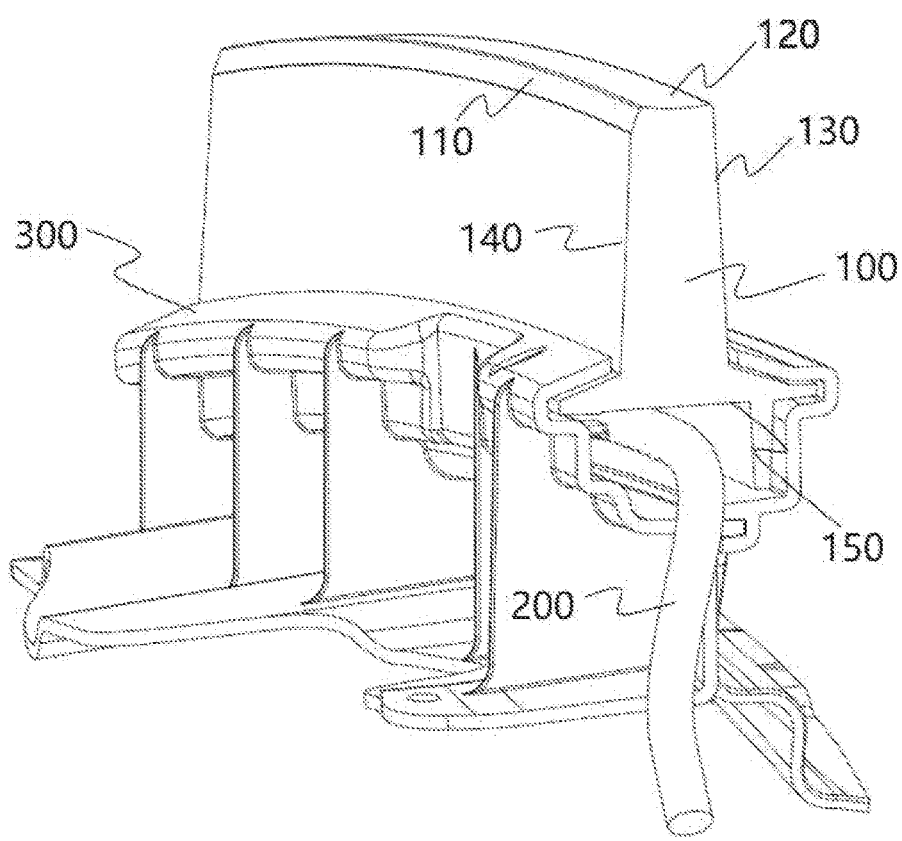
FIG. 1 shows schematically a structural schematic view of a vehicle lamp according to an embodiment of the present utility model.

| 100 | optical element | 110 | connecting surface |
|---|---|---|---|
| 1101 | enhanced reflection part | 1102 | spacing part |
| 120 | light exit surface | 130 | first reflective surface |
| 140 | second reflective surface | 150 | light entry surface |
| 200 | light source part | 300 | support part |

DETAILED DESCRIPTION

Preferred embodiments of the present utility model are described in greater detail below with reference to the accompanying drawings. Although preferred embodiments of the present utility model are shown in the drawings, it should be understood that the present utility model may be realized in various forms, and should not be restricted by the embodiments expounded here. On the contrary, these embodiments are provided in order to make the present utility model more thorough and complete, and to enable the scope of the present utility model to be conveyed to those skilled in the art in a complete fashion.

According to an embodiment of the present utility model, an optical element 100 and a corresponding vehicle lamp, as well as a vehicle having the vehicle lamp, are disclosed.

Referring to FIG. 1, the vehicle lamp according to the present utility model comprises an optical element 100 and a light source part 200.

The light source part 200 includes but is not limited to:
1) a point light source; the light source being in the form of a point;
2) a line light source; the light source being linear or in the form of a long strip;
3) a surface light source: the light source being in the form of a surface.

Preferably, referring to FIG. 1, according to one solution of the present utility model, the light source part 200 is a strip light source 200 realized by a strip light guide.

The strip light source 200 is mounted at a light entry surface 150 side of the optical element 100, so that light of the strip light source 200 enters the light entry surface 150.

According to a preferred solution of the present utility model, the vehicle lamp further comprises a support part 300, for supporting the optical element (100) and the light source part (200).

The optical element 100 comprises the light entry surface 150, a light exit surface 120, a first reflective surface 130 and a second reflective surface 140, and at least one connecting surface 110 located between the first reflective surface 130 and/or the second reflective surface 140 on the one hand and the light exit surface 120 on the other.

The connecting surface 110 comprises an enhanced reflection part 1101 for expanding a maximum exit angle β of emergent light exiting via the light exit surface 120.

Specifically, light of the light source part 200 enters the optical element 100 via the light entry surface 150, and a portion of incident light reaches the enhanced reflection part 1101, wherein incident light may reach the enhanced reflection part 1101 after reflection by the first reflective surface 130 and/or the second reflective surface 140, or reach the enhanced reflection part 1101 directly without undergoing reflection; and after reflection by the enhanced reflection part 1101, exits through the light exit surface 120.

The light entry surface 150 and light exit surface 120 of the optical element 100 are opposite each other and not adjacent to each other, and the light entry surface 150 and light exit surface 120 have similar widths. Preferably, the height of the optical element 100, i.e. the distance between the light entry surface 150 and the light exit surface 120, is greater than the respective widths of the light entry surface 150 and the light exit surface 120. (See FIG. 2). Referring to FIGS. 2-5, observed from a side view, a side of the optical element 100 substantially takes the form of a long and narrow trapezium, in which the widths of the light exit surface 120 and the light entry surface 150 serve as upper and lower edges, and the heights of the first reflective surface 130 and the second reflective surface 140 serve as oblique edges, wherein an edge formed by the connecting surface 110 is present between at least one oblique edge and the upper edge formed by the light exit surface 120.

Figure 6:
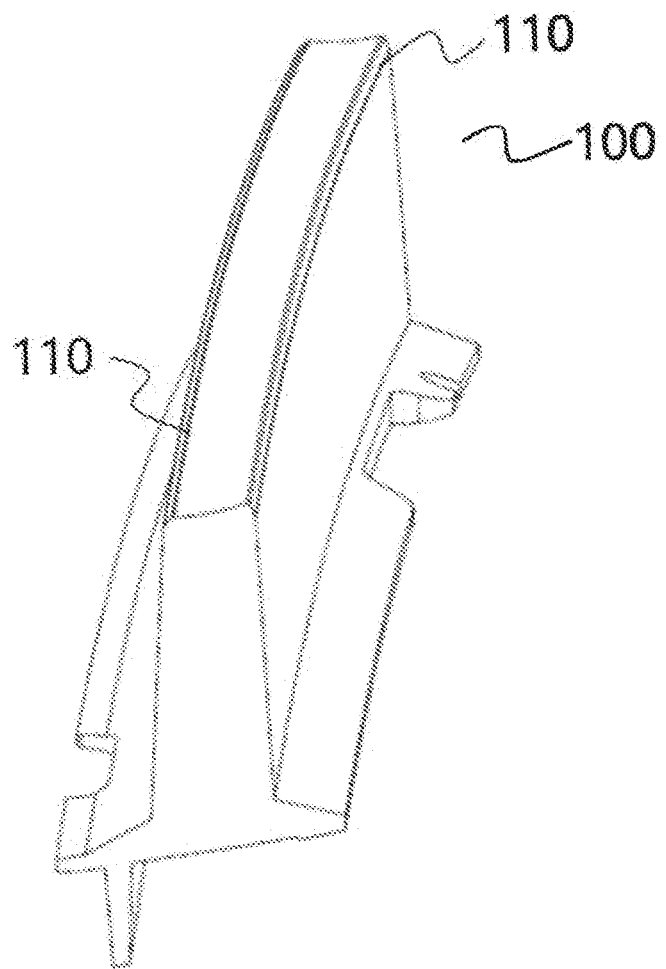
FIG. 6 shows schematically a structural schematic view of an optical element according to another embodiment of the present utility model.

According to a preferred embodiment of the present utility model, referring to FIG. 6, the optical element 100 comprises two connecting surfaces 110, wherein one of the connecting surfaces 110 is located between the first reflective surface 130 and the light exit surface 120; and one of the connecting surfaces 110 is located between the second reflective surface 140 and the light exit surface 120.

According to a preferred embodiment of the present utility model, the enhanced reflection part 1101 comprises at least any one of the following optical structures:
1) one or more straight-surface structures;
2) one or more curved-surface structures;
wherein at least one straight-surface structure or at least one curved-surface structure contained in the enhanced reflection part 1101 can make the maximum exit angle greater than or equal to the angle threshold.

According to a preferred embodiment of the present utility model, supposing the angle threshold is α, then the enhanced reflection part 1101 can make the maximum exit angle greater than or equal to α. Those skilled in the art should be able to determine the angle threshold according to actual circumstances and needs. Preferably, the angle threshold according to the present utility model is 80 degrees.

Figure 2:
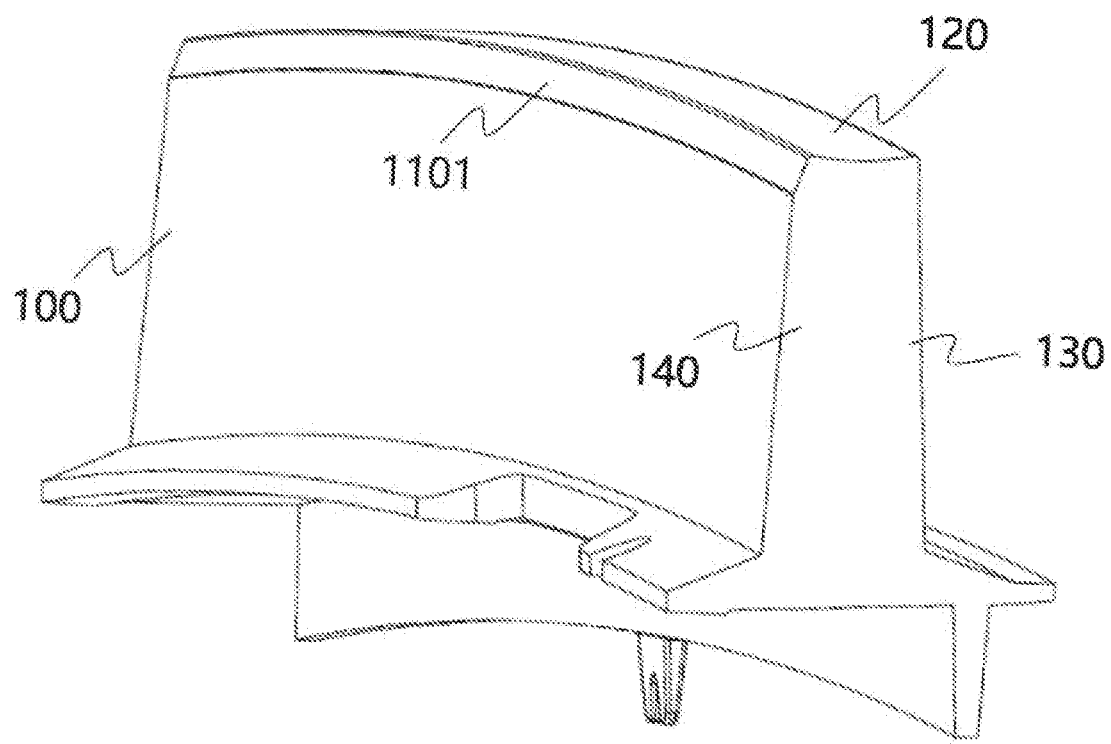
FIG. 2 shows schematically a structural schematic view of an optical element according to an embodiment of the present utility model.
Figure 3:
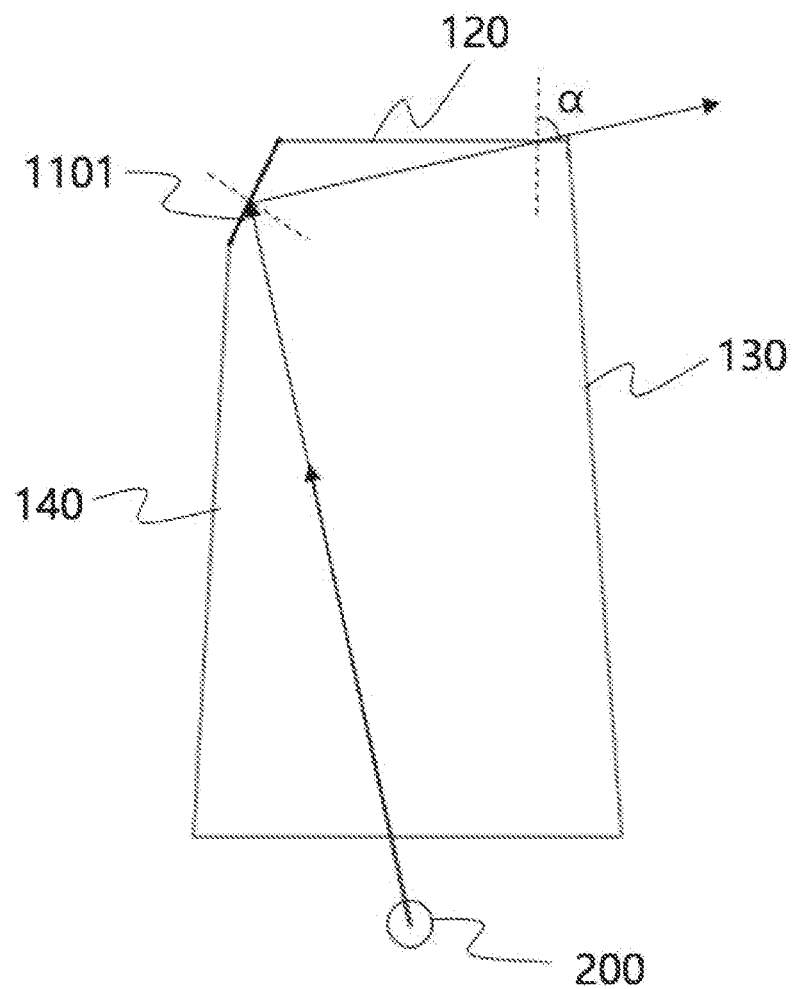
FIG. 3 shows schematically a schematic light path diagram of an optical element according to an embodiment of the present utility model.

Referring to FIGS. 2 and 3, FIG. 2 shows schematically an enhanced reflection part 1101 employing a straight-surface structure, and FIG. 3 shows schematically a laterally viewed light path diagram according to an embodiment of the present utility model; the enhanced reflection part 1101 is adjacent to the second reflective surface 140 at one side and adjacent to the light exit surface 120 at another side. A light beam from the light source exits through the light exit surface 120 after reflection by the enhanced reflection part 1101; the maximum exit angle thereof is α.

Figure 4:
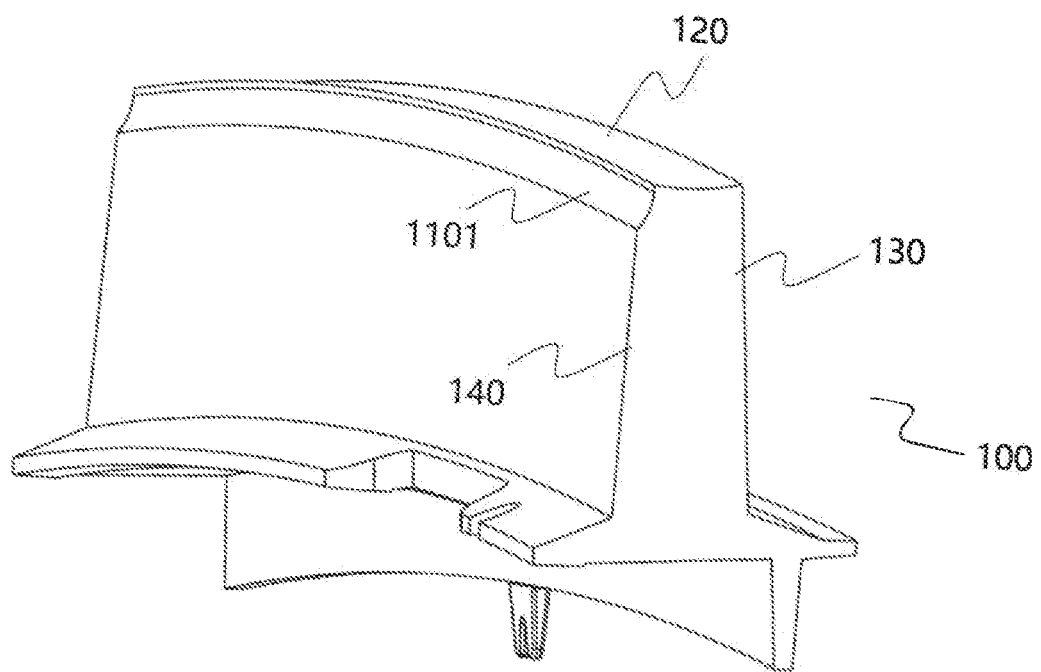
FIG. 4 shows schematically an optical element according to another embodiment of the present utility model.
Figure 5:
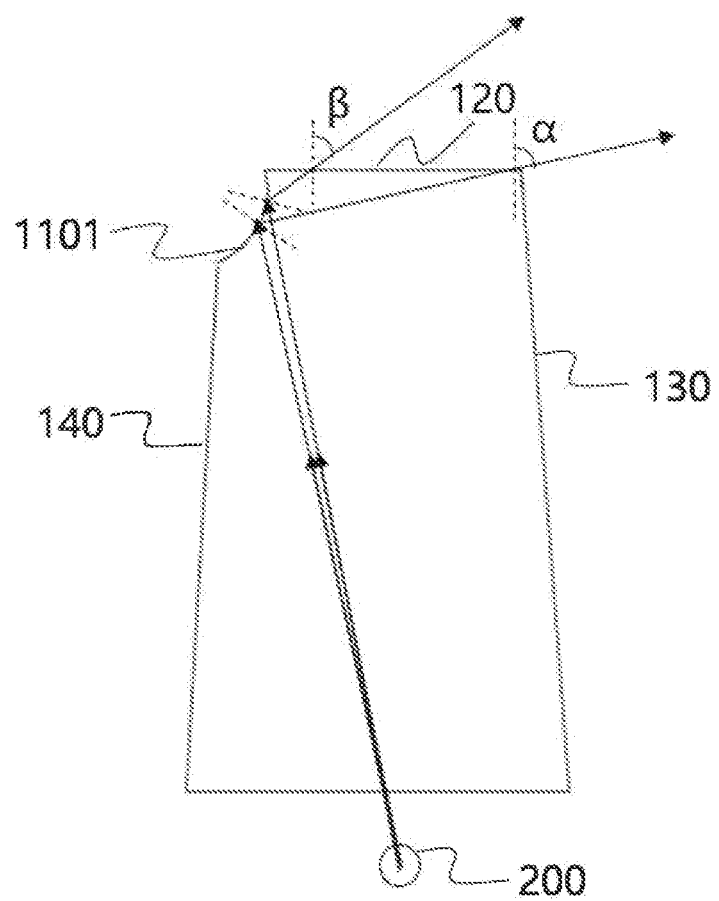
FIG. 5 shows schematically a schematic light path diagram of an optical element according to another embodiment of the present utility model.

Referring to FIGS. 4 and 5, FIG. 4 shows schematically an enhanced reflection part 1101, employing a curved-surface structure, according to another embodiment of the present utility model. The enhanced reflection part 1101 is adjacent to the second reflective surface 140 at one side and adjacent to the light exit surface 120 at another side. It can be seen from the laterally viewed light path diagram shown in FIG. 5 that the enhanced reflection part 1101 employing a curved surface can enable an exit angle β of an emergent light beam to be distributed within a range between an exit angle of 0 degrees and the maximum exit angle α.

Figure 7:
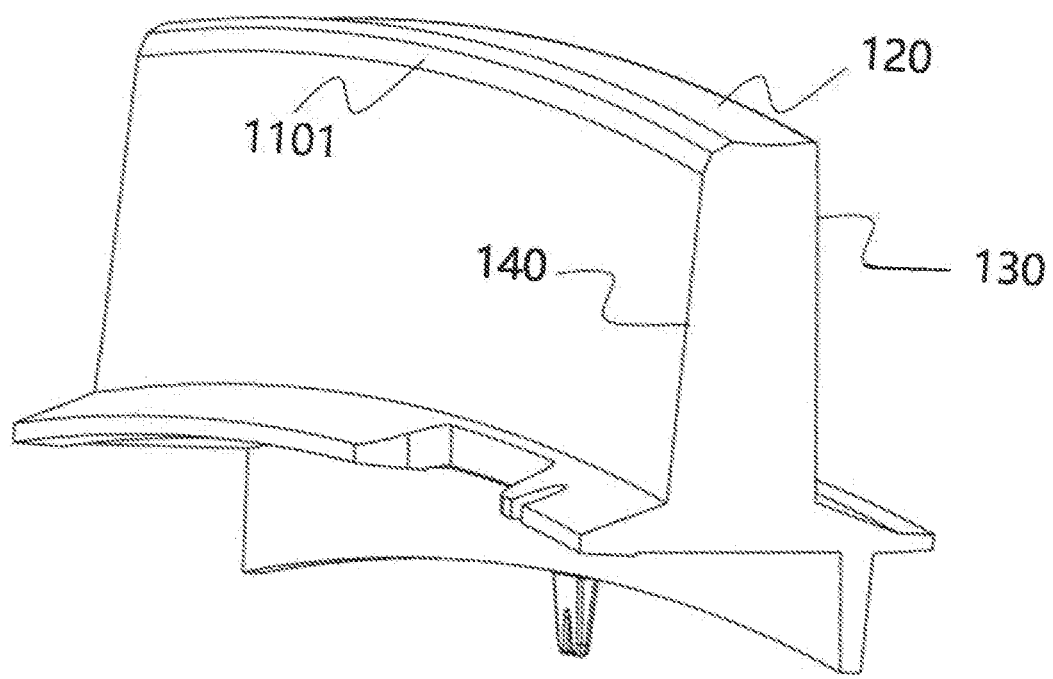
FIG. 7 shows schematically a structural schematic view of an optical element according to another embodiment of the present utility model.
Figure 8:
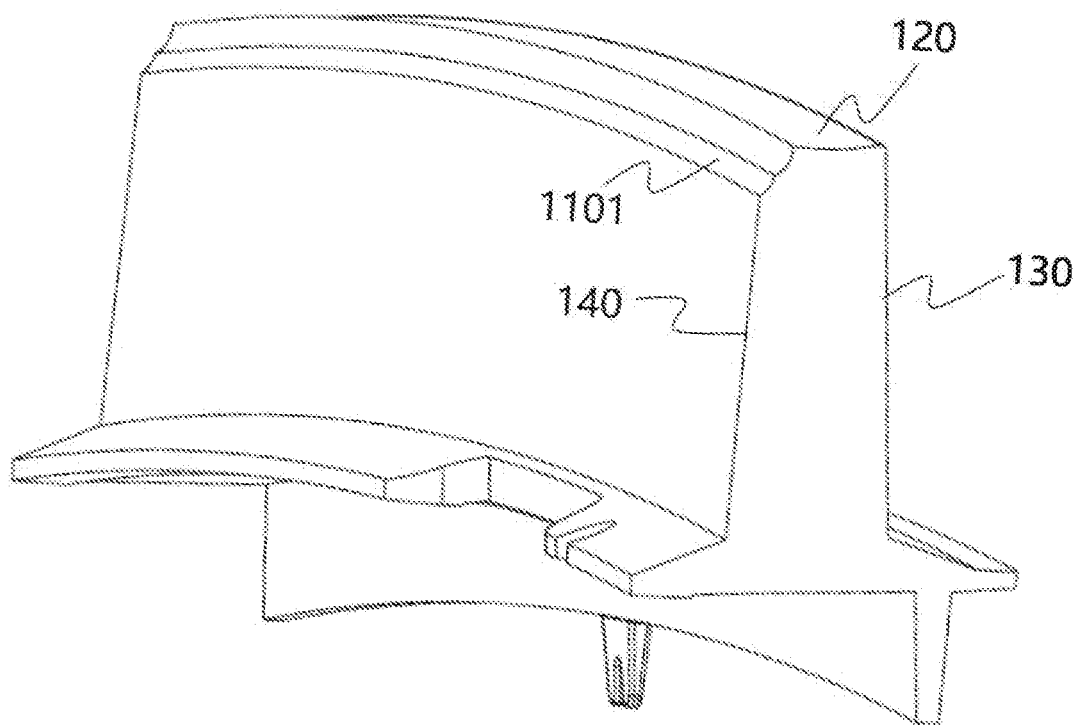
FIG. 8 shows schematically a structural schematic view of an optical element according to another embodiment of the present utility model.

Preferably, the enhanced reflection part 1101 according to the present utility model may be a combination of multiple structures, for example may be a combination of two or more straight surfaces (see FIG. 7), or as another example, may be a combination of two or more curved surfaces (see FIG. 8), or as another example, may be a combination of a straight surface and a curved surface (not shown in the figures), etc.

Figure 9:
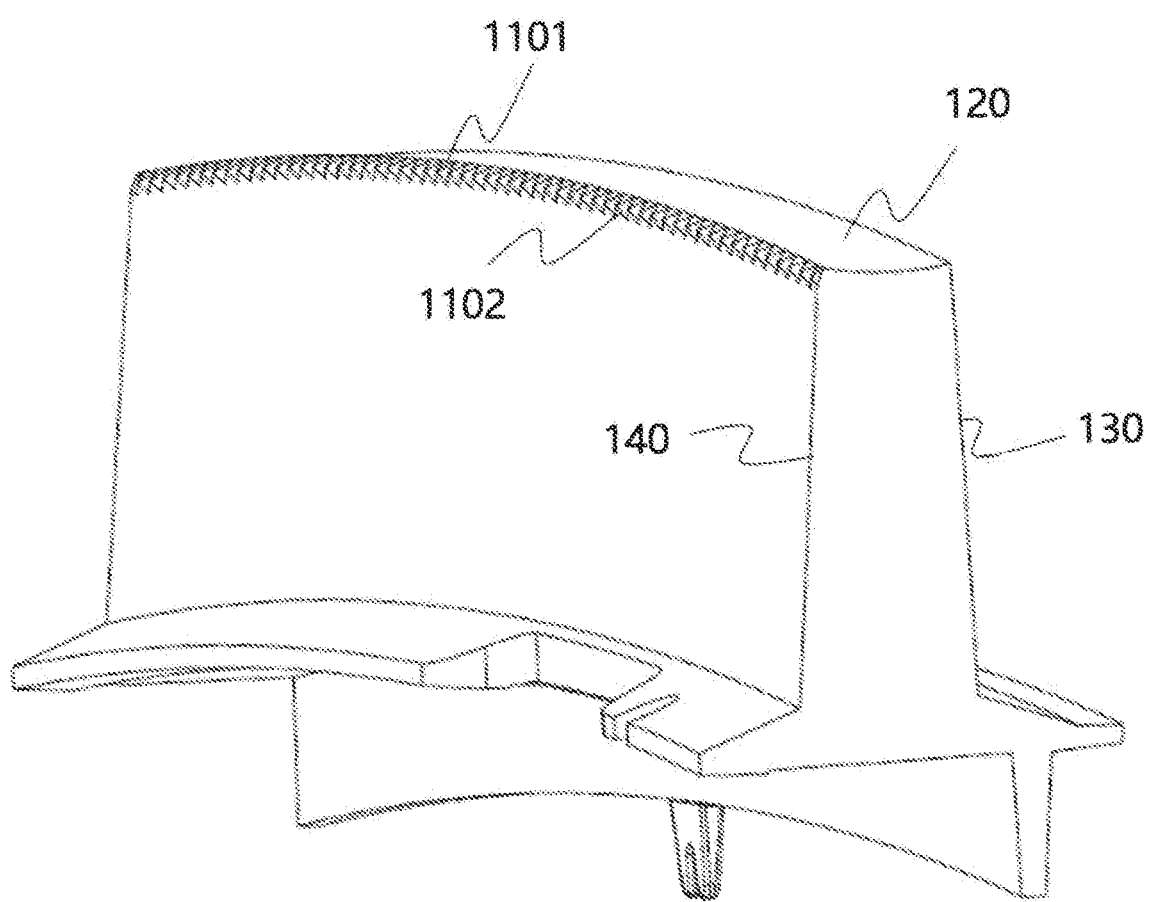
FIG. 9 shows schematically a structural schematic view of an optical element according to another embodiment of the present utility model.
Figure 10:
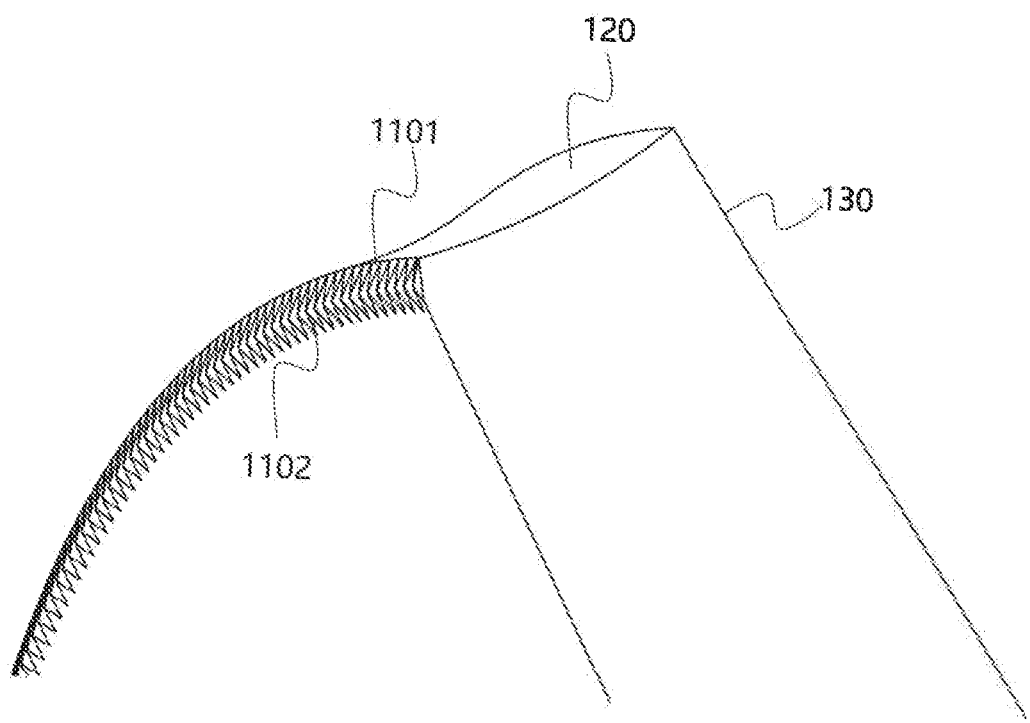
FIG. 10 shows schematically a partial structural schematic view of an optical element according to another embodiment of the present utility model.
Figure 11:
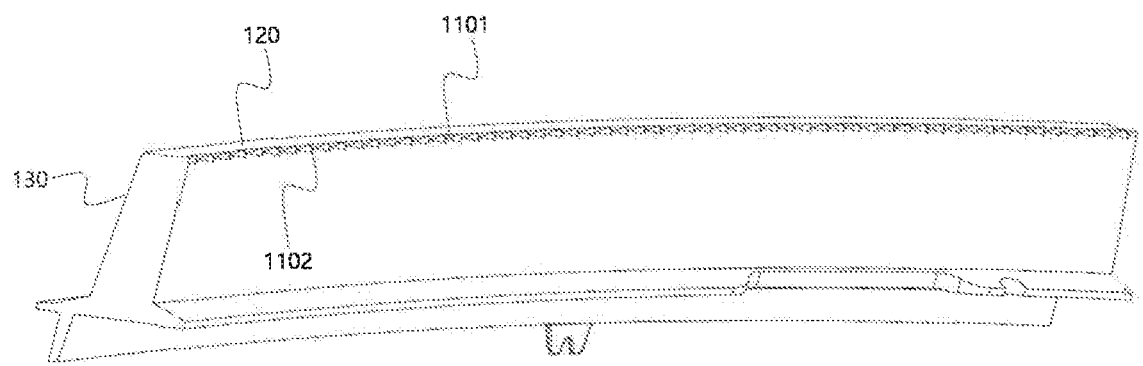
FIG. 11 shows schematically a structural schematic view, from another angle, of an optical element according to another embodiment of the present utility model.

More preferably, the connecting surface 110 according to the present utility model comprises the enhanced reflection part 1101 and a decorating part 1102. Referring to FIGS. 9-11, FIG. 9 shows schematically a connecting surface 110 in which the enhanced reflection part 1101 and the decorating part 1102 are arranged in an alternating manner. FIG. 10 shows schematically a partial schematic view of the connecting surface 110; FIG. 11 shows schematically a structural schematic view from another angle.

Preferably, the decorating part 1102 may have multiple shapes.

More preferably, the shape employed for the decorating part may be determined according to the external structure required.

According to a solution of the present utility model, there is no need to process a surface at the light exit surface, so the range of applicability of the optical element is increased; moreover, the optical element according to the present utility model has a greater distance between the light exit surface and light entry surface thereof, i.e. can be thicker, so the optical element can adapt to a greater variety of shapes.

To a person skilled in the art, it is obvious that the present utility model is not limited to the details of the demonstrative embodiments above, and could be implemented in other specific forms without deviating from the spirit or fundamental features of the present utility model. Thus, regardless of which viewpoint is taken, the embodiments should be regarded as being demonstrative and non-limiting; the scope of the present utility model is defined by the attached claims and not by the explanation above, hence it is intended that all changes falling within the meaning and scope of equivalent key elements of the claims be included in the present utility model. No reference labels in the claims should be regarded as limiting the claims concerned. In addition, it is obvious that the word "comprises" does not exclude other units or steps, and the singular does not exclude the plural. Multiple units or apparatuses presented in system claims may also be realized by one unit or apparatus by means of software or hardware. Words such as first and second are used to indicate designations, and do not indicate any specific order.

What is claimed is:

1. An optical element, wherein the optical element comprises:
 a light entry surface;
 a first reflective surface and a second reflective surface;
 a light exit surface; and
 a first connecting surface located between the light exit surface and a second reflective surface;
 a second connecting surface located between the light exit surface and the first reflective surface, wherein the first connecting surface at least partly includes an enhanced reflection part for expanding a maximum exit angle (β) of emergent light configured to exit the light exit surface; and
 wherein at least one straight-surface structure or at least one curved-surface structure contained along the enhanced reflection part can make the maximum exit angle (β) of emergent light greater than an angle threshold (α);
 wherein the first connecting surface along the enhanced reflection part includes a decorating part, the decorating part retaining a combination of optical structures of an arrangement of optical elements configured to produce a variety of light exit angles.

2. The optical element according to claim 1, wherein the enhanced reflection part can make the maximum exit angle (β) of emergent light greater than an angle threshold (α).

3. The optical element according to claim 1, wherein the enhanced reflection part includes at least any one of the following optical structures:
 one or more straight-surface structures;
 one or more curved-surface structures.

4. The optical element according to claim 1, wherein the second connecting surface includes an enhanced reflection part and a decorating part.

5. The optical element according to claim 2, wherein the angle threshold (α) is 80 degrees.

6. A vehicle lamp, comprising
 an optical element, the optical element including:
 a light entry surface;
 a first reflective surface and a second reflective surface;
 a light exit surface;
 at least a first connecting surface with the first connecting surface located between the light exit surface and a second reflective surface;
 at least a second connecting surface located between the light exit surface and a first reflective surface, wherein the first connecting surface at least partly includes an enhanced reflection part for expanding a maximum exit angle (β) of emergent light exiting via the light exit surface;
 a light source part, with the light source part being immediately adjacent to the light entry surface of the optical element; and
 wherein at least one straight-surface structure or at least one curved-surface structure contained in the enhanced reflection part can make the maximum exit angle (β) of emergent light greater than an angle threshold (α);
 wherein the enhanced reflection part includes a decorating part along the respective connecting surface, the decorating part retaining a combination of optical structures of an arrangement of optical elements configured to produce a variety of light exit angles.

7. The vehicle lamp according to claim 6, wherein the light source part employs a strip light guide.

8. The vehicle lamp according to claim 6, wherein the vehicle lamp further includes a support part for supporting the optical element and the light source part.

9. The optical element according to claim 6, wherein the optical element with the at least second connecting surface includes an enhanced reflection part for expanding a maximum exit angle ($\beta$) of emergent light exiting via the light exit surface.

10. The optical element according to claim 6, wherein the angle threshold ($\alpha$) is 80 degrees.

11. The optical element according to claim 6, wherein the enhanced reflection part includes at least any one of the following optical structures:
   one or more straight-surface structures;
   one or more curved-surface structures.

12. The optical element according to claim 6, wherein the connecting surface fully includes the enhanced reflection part with a decorating part, the decorating part retaining a combination of optical structures of an arrangement of optical elements configured to produce a variety of light exit angles.

* * * * *

UNITED STATES PATENT AND TRADEMARK OFFICE
CERTIFICATE OF CORRECTION

PATENT NO. : 12,018,809 B2
APPLICATION NO. : 17/467504
DATED : June 25, 2024
INVENTOR(S) : Liang Dai, Sihua Wu and Neo-Liubo Wang It is certified that error appears in the above-identified patent and that said Letters Patent is hereby corrected as shown below:

In the Claims

In Claim 1, Column 6, Line 16, instead of ". . . surface and a second reflective surface;" amend to --surface and the second reflective surface;--

In Claim 1, Column 6, Line 25, instead of ". . . reflection part can make the maximum . . ." amend to --. . . reflection part makes the maximum . . .--

In Claim 6, Column 6, Line 52, instead of ". . . a second reflective surface;" amend to --. . . the second reflective surface;--

In Claim 6, Column 6, Line 54, instead of ". . . exit surface and a first reflective . . ." amend to --. . . exit surface and the first reflective . . .--

In Claim 6, Column 6, Line 64, instead of ". . . reflection part can make the maximum . . ." amend to --. . . reflection part makes the maximum . . .--

Signed and Sealed this
Twentieth Day of August, 2024

Katherine Kelly Vidal
*Director of the United States Patent and Trademark Office*